June 30, 1953  R. W. YOUNG ET AL  2,643,756
HANDLING OF ROD BUNDLES OR SIMILAR ANNULI
Filed April 21, 1949  3 Sheets-Sheet 2
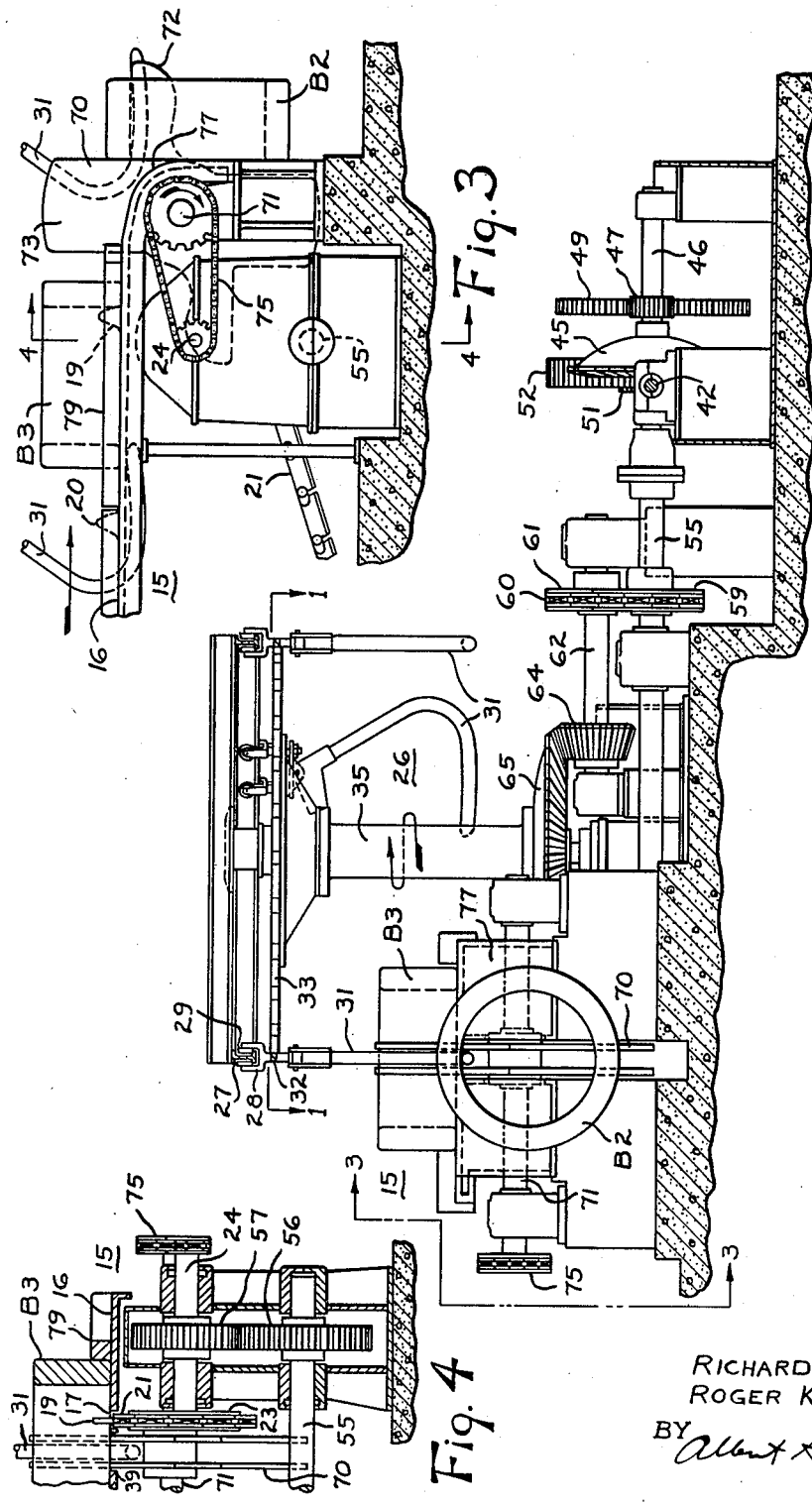
INVENTORS
RICHARD W. YOUNG
ROGER KINNICUTT, JR.
BY Albert G. Blodgett
ATTORNEY

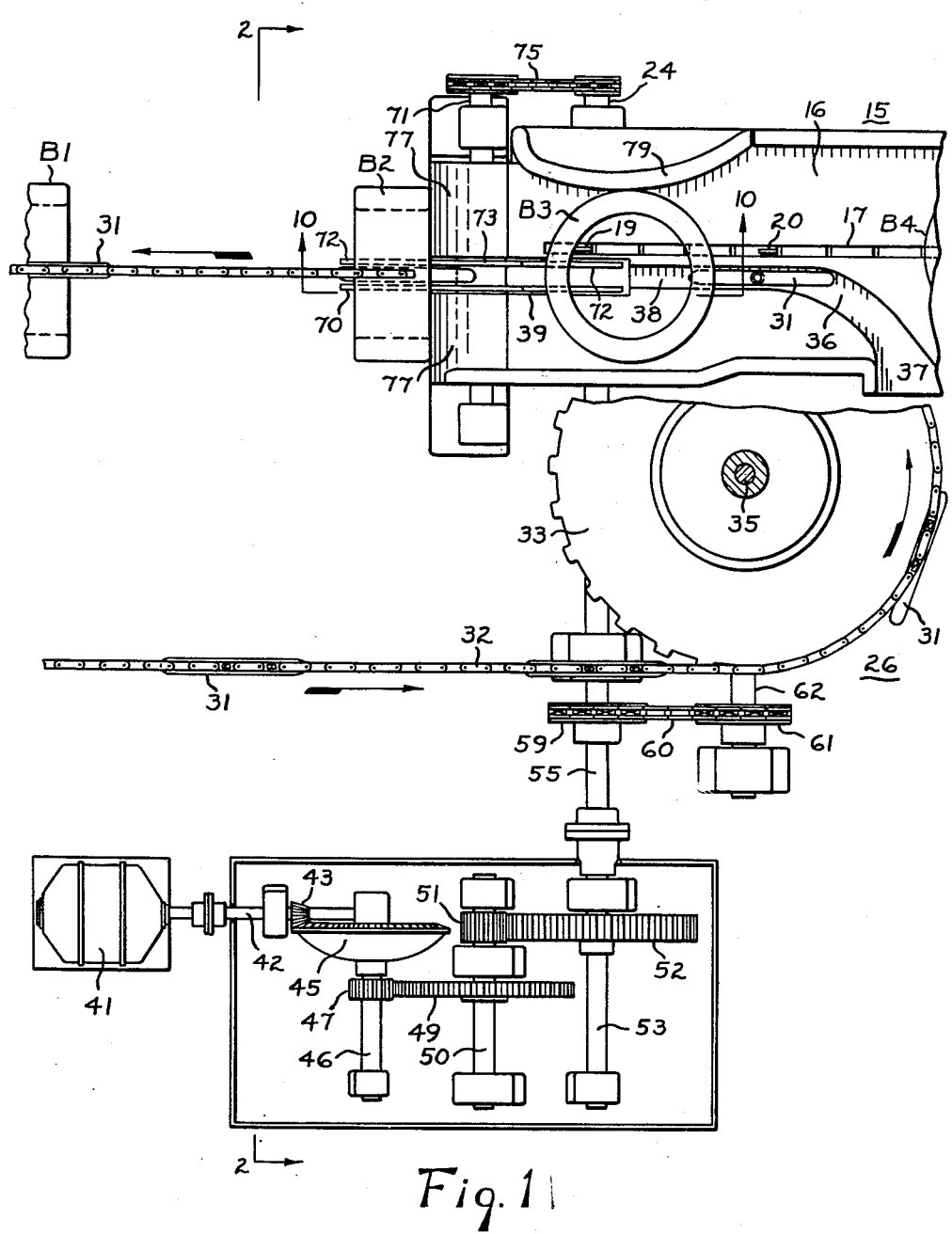

INVENTORS
RICHARD W. YOUNG
ROGER KINNICUTT, JR.
BY
ATTORNEY

Patented June 30, 1953

2,643,756

UNITED STATES PATENT OFFICE 2,643,756

HANDLING OF ROD BUNDLES OR SIMILAR ANNULI

Richard W. Young and Roger Kinnicutt, Jr., Worcester, Mass., assignors to Morgan Construction Company, Worcester, Mass., a corporation of Massachusetts Application April 21, 1949, Serial No. 88,712

14 Claims. (Cl. 198—25)

This invention relates to the handling of rod bundles or similar annuli, and more particularly to the transfer of annular bundles of rolled metal rod or the like from one conveyor to another.

In rod rolling mills it is the practice to coil the rods while they are at a red heat into annular bundles which are carried along with their axes substantially vertical on a so-called "coil" conveyor. This conveyor includes an endless chain having projecting dogs which engage the rod bundles and bring about the desired movement thereof. From the coil conveyor the bundles are transferred, while still hot, to a "hook carrier" which comprises a series of suspended hooks upon which the bundles are hung with their axes substantially horizontal.

The prior apparatus best adapted for this purpose, so far as we are aware, is that disclosed in the United States patent to Young et al. No. 2,199,061, granted April 30, 1940. While this patented mechanism operates with considerable satisfaction, it is nevertheless subject on occasion to certain disadvantages, particularly when handling bundles which are high in proportion to their diameter. For example, as each bundle reaches the end of the coil conveyor and tips downwardly, there is in some cases insufficient support for the upper convolutions of the bundle, and these convolutions tend to slide forwardly and to become disarranged, so that the hook may not always pass through them in a proper manner. In some plants this has made it necessary to provide an extra operator, whose duty it is to watch each bundle as it leaves the conveyor and to replace any disarranged convolutions. Furthermore, with the prior mechanism the bundles are required to drop slightly onto the hooks, and this sometimes jars the bundles enough to distort them into elliptical shapes, which is highly undesirable.

It is accordingly one object of the invention to provide a dependable and efficient apparatus for handling rod bundles or the like at the discharge end of a conveyor.

It is a further object of the invention to provide a thoroughly reliable and comparatively simple apparatus for transferring rod bundles or the like from a coil conveyor to a hook carrier.

It is a further object of the invention to provide a simple and dependable apparatus arranged to transfer rod bundles or the like from a coil conveyor to a hook carrier without disarranging the convolutions of the bundle or otherwise damaging the same.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a plan view of an apparatus for handling rod bundles, the view being shown partially in section as taken approximately on the line 1—1 of Fig. 2;

Fig. 2 is a sectional elevation taken on the line 2—2 of Fig. 1;

Fig. 3 is a sectional elevation taken on the line 3—3 of Fig. 2;

Fig. 4 is a section taken on the line 4—4 of Fig. 3; and

Figure 8:
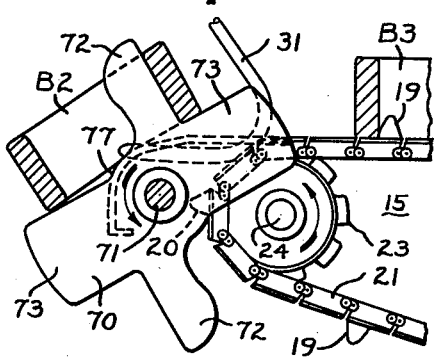
Figure 9:
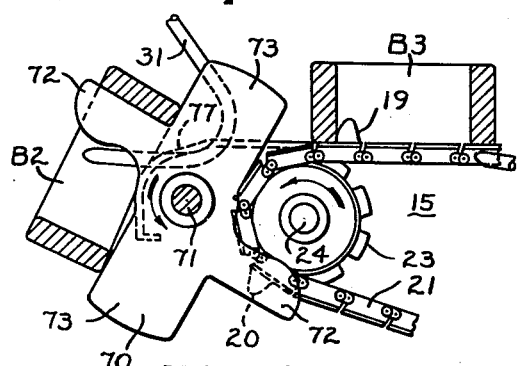
Figure 10:
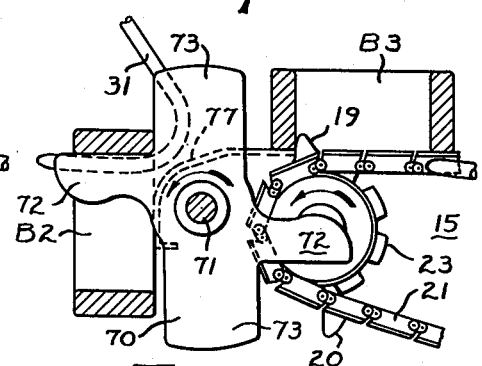

Figs. 5 to 10 inclusive are a series of diagrammatic sectional views showing the successive positions of the parts as they transfer a bundle, Fig. 10 being taken approximately on the line 10—10 of Fig. 1, and Figs. 5 to 9 inclusive being taken on the same line but with the parts in different positions.

The embodiment illustrated comprises a coil conveyor 15 comprising a flat substantially horizontal plate structure 16 having a central longitudinally extending slot 17 therein. A series of dogs 19 and 20 project upwardly through the slot 17 from an endless chain 21 which passes downwardly around a sprocket wheel 23 mounted on a transverse horizontal shaft 24 adjacent the discharge end of the conveyor. The dogs 19, which may be called pulling dogs, alternate with the dogs 20. The annular coils or bundles of rod are supported upon the plate structure 16 with the axes of the bundles upright and with the dogs 19 extending into the interiors of the bundles, so that as these dogs move forwardly they will engage the bundles and pull them along the plate structure 16. The dogs 20, which may be called pusher dogs, are located between successive bundles, and they come into use only as the pulling dogs 19 pass downwardly around the sprocket wheel 23, as will be explained hereinafter.

Adjacent the discharge end of the coil conveyor 15 there is provided a hook carrier 26 comprising an overhead horizontal rail 27 of I cross section (Fig. 2) and a series of brackets 28 having wheels 29 thereon engaging the lower flange of the rail, each bracket carrying a depending forwardly directed hook 31. The brackets 28 are all connected to an endless chain 32 which travels about a large horizontal sprocket wheel 33 mounted on a vertical shaft 35. As shown in Fig. 1, the sprocket wheel 33 is so located that as the hooks 31 pass around this wheel they will enter a groove 36 formed in the upper surface of the plate structure 16. The entrance portion 37 of this groove is curved substantially concentrically with the wheel 33, and this curved portion leads to a straight tangential portion 38 which is close to the slot 17 and parallel therewith. The tangential portion 38 leads directly into one end of a slot 39 which is aligned with the portion 38 and extends forwardly beyond the slot 17.

The coil conveyor 15 and the hook carrier 26 are driven in a fixed speed relationship such that for each bundle delivered by the conveyor chain 21 to the discharge end of the conveyor, a hook 31 will arrive at the proper time to receive such bundle. Preferably the linear speeds of the chain 21 and of the hooks 31 are substantially the same, and accordingly the spacing of successive pulling dogs 19 along the chain 21 is substantially equal to the spacing of successive hooks 31 along the chain 32. The sprocket wheels 23 and 33 are driven from a common source of power, such as an electric motor 41 (Fig. 1). This motor drives a shaft 42 carrying a bevel pinion 43 which drives a bevel gear 45 on a shaft 46. The latter shaft carries a pinion 47 which drives a gear 49 on a shaft 50. The shaft 50 carries a pinion 51 which drives a gear 52 on a shaft 53, the latter being coupled directly to an aligned shaft 55. As shown in Fig. 4, the shaft 55 carries a gear 56 which drives a gear 57 carried by the shaft 24 of the sprocket wheel 23 of the coil conveyor 15. The shaft 55 also carries a sprocket wheel 59 (Figs. 1 and 2) which is connected by a chain 60 to a sprocket wheel 61 on a shaft 62. The latter carries a bevel pinion 64 (Fig. 2) which drives a bevel gear 65 carried by the vertical shaft 35 of the sprocket wheel 33 of the hook carrier 26.

The rod bundles or similar annuli to be handled by the apparatus are transferred one at a time from the coil conveyor 15 to the hook carrier 26. In the drawings these bundles are designated as B1, B2, B3, etc. in the order of their arrival. In order to effect the transfer there is provided a wheel 70 which is mounted upon a transverse horizontal rotatable shaft 71 located immediately in front of the sprocket wheel 23. The upper portion of the wheel 70 extends upwardly through the slot 39. As shown in Figs. 5 to 10, the wheel 70 is constructed with two diametrically opposed arms 72, which may be called suspending arms, and with two diametrically opposed arms 73, which may be called supporting arms. The arms 72 alternate with the arms 73. The wheel 70 is rotated in the same direction as the sprocket wheel 23 of the coil conveyor 15 and in a fixed speed relationship thereto, this relationship being such that the wheel 70 will make one-half revolution for each dog 19 reaching the sprocket wheel 23. Thus, if the sprocket wheel 23 has eight teeth, and there is a pulling dog 19 on each eighth link of the conveyor chain 21, the wheel 70 will rotate at one-half the speed of the sprocket wheel 23. In order to maintain the desired speed relationship, the shaft 24 of the conveyor is arranged to drive the shaft 71 of the transfer wheel 70 through a chain-and-sprocket connection 75 of the proper ratio (Fig. 3). Each of the arms 72 and 73 is of a dual construction, with two identically shaped laterally adjacent parts between which the carrier hooks 31 may travel without interference, as shown in Figs. 1 and 4. At each side of the wheel 70 there is mounted a stationary plate 77. These plates form continuations of the conveyor plate 16 and they are curved downwardly and forwardly in a circular arc coaxial with the wheel 70 to provide a convex cylindrical surface on which the lateral portions of the bundles may rest as they are carried around by the wheel. An upstanding wall 79 is provided on the conveyor plate 16 near the discharge end of the conveyor and on the opposite side of the slot 17 from the groove 36. This wall is inclined in such a way as to deflect each bundle laterally into approximate alignment with the slot 39, as best shown in Fig. 1.

Figure 5:
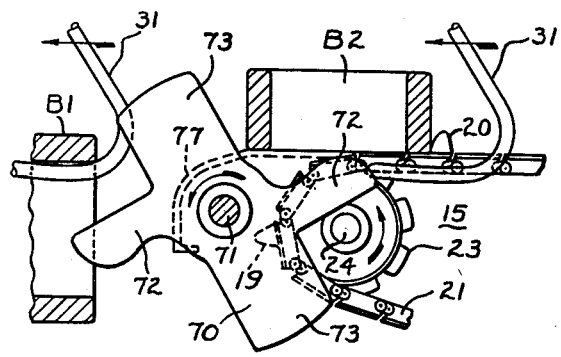
Figure 6:
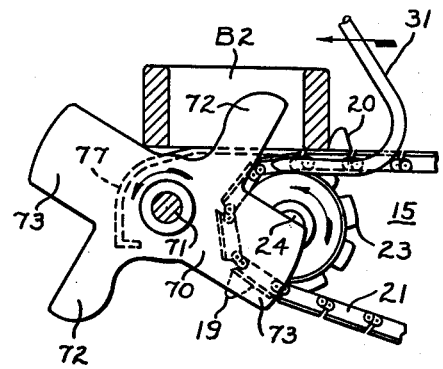
Figure 7:
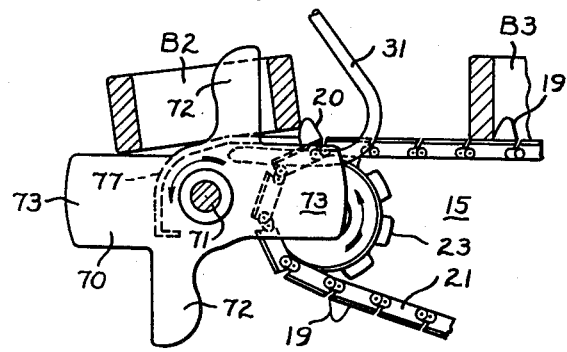

In the operation of the invention the bundles will be moved along the conveyor 15 by the pulling dogs 19, each of which will project upwardly within the interior of the bundle, as shown in the case of the bundle B3 in Figs. 7, 8 and 9. As each bundle approaches the discharge end of the conveyor 15, it will engage the inclined wall 79 and thereby be deflected slightly to one side into better alignment with the slot 39. At the same time one of the hooks 31 will travel in an arcuate path along the groove 36, and the front end of the hook will pass beneath the rear portion of the bundle. When the corresponding pulling dog 19 reaches the sprocket wheel 23, and starts to pass downwardly around the same as shown in Fig. 10, it will be withdrawn from its engagement with the bundle, which will then cease its forward motion. After a brief interval the next pusher dog 20 will engage the rear surface of the bundle and push it along, as shown in the case of the bundle B2 in Figs. 5 and 6. At the same time one of the suspending arms 72 of the transfer wheel 70 will move upwardly and forwardly into the central opening of the bundle. When the pusher dog 20 starts to move downwardly around the sprocket wheel 23 and out of contact with the bundle, as shown in Fig. 7, the supporting arm 73 on the rear portion of the transfer wheel will move upwardly beneath the rear portion of the bundle and tilt the bundle forwardly and downwardly. This will cause the bundle to slide ahead slightly until it engages the rear or trailing surface of the corresponding suspending arm 72, as shown in Fig. 8. At this time the front portion of the bundle will rest on the other supporting arm 73, its rear portion will rest on the rear supporting arm 73, and its two side portions will rest on the curved plates 77 at the opposite sides of the transfer wheel. The arm 72 which extends through the bundle will prevent the upper convolutions thereof from sliding forwardly and downwardly relative to the lower convolutions. While the bundle is thus supported, the rotating transfer wheel will carry the bundle with it, as indicated in Fig. 9, until the axis of the bundle is substantially horizontal and the bundle is freely suspended from the arm 72, as shown in Fig. 10. In the meantime the hook 31 has continued to move forwardly and has passed entirely through the bundle, in a position closely beneath the upper portion of the bundle. As the parts of the apparatus continue to move, and the loaded suspending arm 72 travels below the position shown in Fig. 10, the bundle B2 will be deposited gently on the hook 31, which will carry the bundle forwardly out of the path of the transfer wheel, as indicated in Fig. 5 in connection with the bundle B1. As each successive bundle arrives near the discharge end of the conveyor 15, another hook 31 will approach the bundle through the groove 36, and the bundle will be handled in the same manner as the preceding bundle. It will be noted that each bundle is handled gently at all times, and that it is well supported throughout the entire operation. There is no likelihood of the convolutions being disarranged, or of the bundle being distorted into an elliptical shape because of sudden jarring thereof.

Having thus described our invention, what we claim as new and desire to secure by Letters Patent is:

1. Apparatus for handling rod bundles or similar annuli comprising a sprocket wheel rotatable about a horizontal axis, an endless chain extending around the sprocket wheel and having a substantially horizontal upper portion which travels toward the sprocket wheel as the latter rotates, the chain having dogs along its length, the dogs on the upper portion of the chain engaging the bundles to move the same forwardly along with the chain with the axes of the bundles upright until the bundles are above the sprocket wheel, a transfer wheel rotatable about an axis parallel with the axis of the sprocket wheel, the axis of the transfer wheel being spaced forwardly from the axis of the sprocket wheel, and means to rotate the sprocket wheel and the transfer wheel in the same direction, the transfer wheel including an arm arranged to move upwardly into the central opening of a bundle as the bundle arrives above the sprocket wheel, the transfer wheel serving to swing the bundle forwardly and downwardly while the arm prevents the bundle from sliding forwardly relative to the transfer wheel.

2. Apparatus for handling rod bundles or similar annuli comprising a conveyor arranged to move the bundles forwardly with their axes upright, a hook carrier including a series of forwardly directed hooks movable past the discharge end of the conveyor in the same general direction as the bundles on the conveyor, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel including an arm arranged to move upwardly into the central opening of a bundle as it is delivered by the conveyor, the wheel serving to swing the bundle forwardly and downwardly and to place the bundle on one of the hooks.

3. Apparatus for handling rod bundles or similar annuli comprising a sprocket wheel rotatable about a horizontal axis, an endless chain extending around the sprocket wheel and having a substantially horizontal upper portion which travels toward the sprocket wheel as the latter rotates, the chain having pulling dogs and pusher dogs alternating along its length, the pulling dogs on the upper portion of the chain extending into the central openings in the bundles to pull the same along with the chain, and the pusher dogs engaging the bundles from the rear, as the pulling dogs pass downwardly around the sprocket wheel, to push the bundles still further, a transfer wheel located in front of the sprocket wheel and slightly to one side thereof, the transfer wheel being rotatable about an axis parallel with the axis of the sprocket wheel, the transfer wheel having two diametrically opposite suspending arms alternating with two diametrically opposite supporting arms, means to rotate the sprocket wheel and the transfer wheel in the same direction and in such a speed relationship that as each bundle arrives adjacent to the transfer wheel one of the suspending arms will move upwardly into the central opening of the bundle and the two supporting arms will support the front and rear portions of the bundle as the wheel swings the bundle forwardly and downwardly, and a hook carrier having a series of forwardly directed hooks movable past the transfer wheel in the same general direction as the bundles are moved by the chain, each hook being arranged to receive a bundle from the corresponding suspending arm as the latter moves downwardly past the hook.

4. Apparatus for handling rod bundles or similar annuli comprising a conveyor arranged to move the bundles forwardly with their axes upright, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel being shaped to receive each bundle as it is delivered by the conveyor and to swing the bundle forwardly and downwardly as its axis approaches a horizontal position, the wheel including an arm arranged to move upwardly into the central opening of a bundle as it is delivered by the conveyor, the wheel also providing surfaces in front of and behind the arm to support the front and rear portions respectively of the bundle as it is carried forwardly and downwardly by the wheel and as the axis of the bundle approaches a horizontal position.

5. Apparatus for handling rod bundles or similar annuli comprising a conveyor arranged to move the bundles forwardly with their axes upright, a wheel located adjacent the discharge end of the conveyor and rotatable about a substantially horizontal axis which extends transversely of the conveyor, means to rotate the wheel so that its upper portion will move in the same general direction as the bundles on the conveyor, the wheel being shaped to receive each bundle as it is delivered by the conveyor and to swing the bundle forwardly and downwardly as its axis approaches a horizontal position, the wheel being shaped to provide surfaces in front of and behind the arm to support the front and rear portions respectively of the bundle as it is carried forwardly and downwardly by the wheel and the axis of the bundle approaches a horizontal position, and stationary means provided on opposite sides of the wheel to form supporting surfaces for the lateral portions of the bundle while the bundle is being carried by the wheel.

6. Apparatus as set forth in claim 5, in which the said supporting surfaces for the lateral portions of the bundle are convex cylindrical surfaces substantially coaxial with the wheel.

7. Apparatus for handling rod bundles or similar annuli comprising a conveyor arranged to move the bundles forwardly with their axes upright, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel being shaped to receive each bundle as it is delivered by the conveyor and to swing the bundle forwardly and downwardly as its axis approaches a horizontal position, said wheel including a plurality of circumferentially-spaced suspending arms alternating with supporting arms, the suspending arms being arranged to move upwardly into the central openings of the bundles as they are delivered successively by the conveyor, and the supporting arms serving to support the front and rear portions respectively of each bundle as it is carried forwardly and downwardly by the wheel, until the bundle is freely suspended from the corresponding suspending arm.

8. Apparatus for handling rod bundles or similar annuli comprising a conveyor arranged to move the bundles forwardly with their axes upright, a hook carrier including a series of forwardly-directed hooks movable past the discharge end of the conveyor in the same general direction as the bundles on the conveyor, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel being shaped and arranged to receive the bundles as they are delivered by the conveyor and to place the bundles on the hooks of the hook carrier, the wheel including an arm arranged to move upwardly into the central opening of a bundle as it is delivered by the conveyor, the wheel also providing surfaces in front of and behind the arm to support the front and rear portions respectively of the bundle as it is carried forwardly and downwardly by the wheel and as the front end of one hook travels forwardly through the central opening in the bundle.

9. Apparatus for handling rod bundles or similar annuli comprising a conveyor arranged to move the bundles forwardly with their axes upright, a hook carrier including a series of forwardly-directed hooks movable past the discharge end of the conveyor in the same general direction as the bundles on the conveyor, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel including an arm arranged to move upwardly into the central opening of a bundle as it is delivered by the conveyor, the wheel serving to swing the bundle forwardly and downwardly and to place the bundle on one of the hooks, the wheel being constructed with two laterally spaced portions between which the hooks travel while the bundles are placed on the hooks.

10. Apparatus for handling rod bundles or similar annuli comprising a conveyor arranged to move the bundles forwardly with their axes upright, a hook carrier including a series of forwardly-directed hooks movable past the discharge end of the conveyor in the same general direction as the bundles on the conveyor, a wheel located adjacent the discharge end of the conveyor and rotatable about a substantially horizontal axis which extends transversely of the conveyor, means to rotate the wheel so that its upper portion will move in the same general direction as the bundles on the conveyor, the wheel being shaped and arranged to receive the bundles as they are delivered by the conveyor and to place the bundles on the hooks of the hook carrier, and stationary means provided on opposite sides of the wheel to provide convex cylindrical surfaces substantially coaxial with the wheel and arranged continuously to support the lateral portions of the bundles as they are carried around by the wheel.

11. Apparatus for handling rod bundles or similar annuli comprising a conveyor arranged to move the bundles forwardly with their axes upright, a hook carrier including a series of forwardly-directed hooks movable past the discharge end of the conveyor in the same general direction as the bundles on the conveyor, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel including an arm arranged to move upwardly into the central opening of a bundle as it is delivered by the conveyor, the wheel serving to swing the bundle forwardly and downwardly and to place the bundle on one of the hooks, said conveyor including a sprocket wheel located behind the wheel and slightly to one side thereof, the sprocket wheel and the wheel being rotatable in the same direction about parallel axes, and an endless chain extending around the sprocket wheel, the chain having dogs thereon to move the bundles along the conveyor.

12. Apparatus for handling rod bundles or similar annuli comprising a conveyor arranged to move the bundles forwardly with their axes upright, a hook carrier including a series of forwardly-directed hooks movable past the discharge end of the conveyor in the same general direction as the bundles on the conveyor, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel being shaped and arranged to receive the bundles as they are delivered by the conveyor and to place the bundles on the hooks of the hook carrier, said wheel including a plurality of circumferentially spaced suspending arms alternating with supporting arms, the suspending arms being arranged to move upwardly into the central openings of the bundles as they are delivered successively by the conveyor, and the supporting arms serving to support the front and rear portions of each bundle as it is carried forwardly and downwardly by the wheel and as the front end of one hook travels forwardly through the central opening in the bundle.

13. Apparatus for handling rod bundles or similar annuli comprising a conveyor arranged to move the bundles forwardly with their axes upright, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel including an arm arranged to move upwardly into the central opening of a bundle as it is delivered by the conveyor, the wheel serving to swing the bundle forwardly and downwardly and to cause the axis of the bundle to approach a horizontal position, the wheel being shaped to provide surfaces in front of and behind the arm to support the front and rear portions respectively of the bundle as it is carried forwardly and downwardly by the wheel and as the axis of the bundle approaches a horizontal position.

14. Apparatus for handling rod bundles or similar annuli comprising a conveyor arranged to move the bundles forwardly with their axes upright, a hook carrier including a series of forwardly-directed hooks movable past the discharge end of the conveyor in the same general direction as the bundles on the conveyor, a wheel located adjacent the discharge end of the conveyor and rotatable about a substantially horizontal axis which extends transversely of the conveyor, and means to rotate the wheel so that its upper portion will move in the same general direction as the bundles on the conveyor, the wheel including an arm arranged to move upwardly into the central opening of a bundle as it is delivered by the conveyor, the wheel serving to swing the bundle forwardly and downwardly and to place the bundle on one of the hooks, the wheel being shaped to provide surfaces in front of and behind the arm to support the front and rear portions respectively of the bundle as it is carried forwardly and downwardly by the wheel and as the front end of one hook travels forwardly through the central opening in the bundle.

RICHARD W. YOUNG.
ROGER KINNICUTT, JR.

References Cited in the file of this patent

UNITED STATES PATENTS

| Number | Name | Date |
| --- | --- | --- |
| 1,320,812 | Wattleworth | Nov. 4, 1919 |
| 2,024,513 | Diescher | Dec. 17, 1935 |
| 2,135,890 | Gedge | Nov. 8, 1938 |
| 2,199,061 | Young et al. | Apr. 30, 1940 |
| 2,301,747 | Peterson | Nov. 10, 1942 |